W. L. BLISS.
SPRING SEAT BUSHING FOR TENSION RODS.
APPLICATION FILED JAN. 9, 1912.
1,112,669.
Patented Oct. 6, 1914.
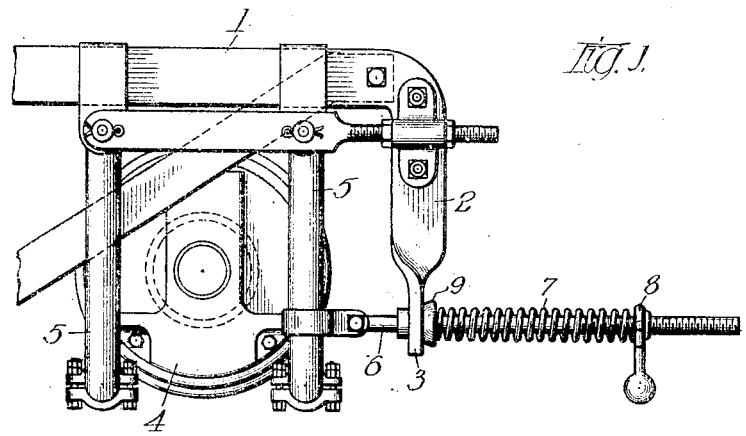
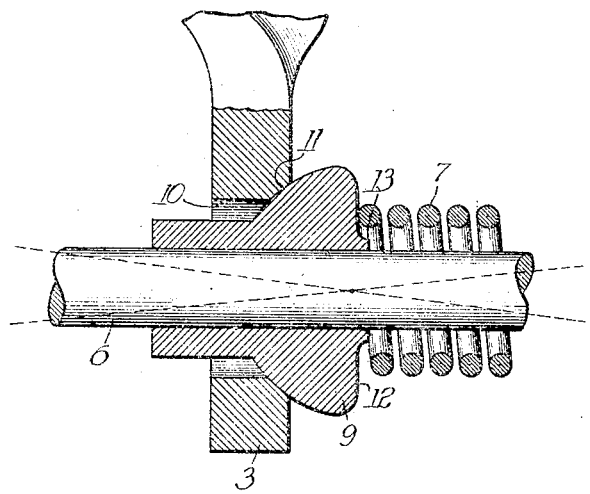
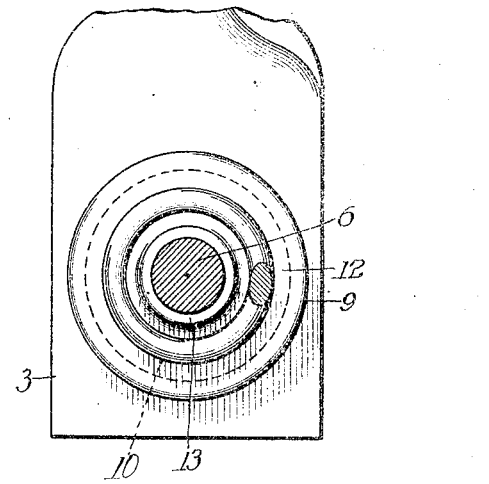
Witnesses:
Robert H. Weir
Geo. B. Jones
Inventor
William L. Bliss
By: Edwin B. Towner Jr.
Atty.

UNITED STATES PATENT OFFICE.

WILLIAM L. BLISS, OF NIAGARA FALLS, NEW YORK, ASSIGNOR, BY MESNE ASSIGNMENTS, TO CENTRAL TRUST COMPANY OF NEW YORK, TRUSTEE, A CORPORATION OF NEW YORK.

SPRING-SEAT BUSHING FOR TENSION-RODS.

1,112,669.  Specification of Letters Patent.  Patented Oct. 6, 1914.

Application filed January 9, 1912. Serial No. 670,280.

*To all whom it may concern:*

Be it known that I, WILLIAM L. BLISS, a citizen of the United States, residing at Niagara Falls, in the county of Niagara and State of New York, have invented new and useful Improvements in Spring-Seat Bushings for Tension-Rods, of which the following is a full, clear, concise, and exact description, reference being had to the accompanying drawing, forming a part of this specification.

My invention relates to spring seat bushings.

In the mounting of car lighting generators adjacent to one of the axles of a car truck, in order to permit said generator to be driven by a belt connection from said axle to the generator armature shaft, it is customary to provide some form of tension device which normally tends to swing the generator away from the driving axle so as to maintain the belt tension. The tension device in many instances includes a tension rod passing through a relatively fixed support and attached at one end either to the car lighting generator or to some portion of the frame which supports said generator, the other end of said rod being provided with a shoulder or abutment of some sort whereby a tension spring, which normally surrounds said rod, is confined between said fixed support and said shoulder thereby tending to thrust said rod in a direction to maintain the tension of the driving belt. When the car is running at a high rate of speed there is, under certain circumstances, considerable play or movement of the tension rod back and forth through the opening in the relatively fixed support. This movement is due partly to the pounding or shocks to which the generator suspension is subjected when the car truck is traveling at a high rate of speed, and it is also due in part to the variations in the effective pull exerted by the belt under different conditions of speed, smoothness of running, etc. As a result of this movement or play of the tension rod, with reference to the opening in the relatively fixed support through which it passes, the wall of said opening wears away considerably, thereby permitting an undesirable looseness of fit and also tending to decrease to an undesirable extent the seating area or bearing area for the end of the tension spring.

The object of my invention is to provide a bushing adapted to fit loosely in a large opening in the relatively fixed support and to receive through an opening therein the tension rod whereby the wear due to the back and forth movement of said tension rod is taken up by the bushing, which latter may be readily replaced if desired. The bushing is seated in said relatively fixed support so as to swivel freely with respect thereto, thereby permitting considerable deviations in the angle made by said tension rod with said support. Furthermore, the bearing area of the bushing may be many times greater than the bearing area which could be used practically if the tension rod passed directly through the support. As a result the wearing away of the opening in said bushing is very much diminished as compared to the wearing in the support where no bushing is used.

In the accompanying drawings I have illustrated a simple and practical embodiment of the invention.

The views of the drawings are as follows:

Figure 1 is an elevation of a form of generator suspension showing the relation of the spring seat bushing to the other parts of the apparatus. Fig. 2 is an enlarged sectional elevation of the spring seat bushing and adjacent parts. Fig. 3 is a front elevation thereof.

The generator suspension selected for the purpose of illustrating the use of the spring seat bushing, comprises a pair of substantially parallel supporting bars 1 which are secured to and project beyond the end of a car truck not shown. The outer portions of these bars are bent downwardly as shown at 2 and have their extremities 3 twisted in a plane substantially at right angles to the plane of the bars. A car lighting generator 4 is supported by depending link members 5, to one of which is attached the tension rod 6. The tension rod is normally impelled away from the generator by the spring 7 held between the adjustable nut 8 on the tension bar and the spring seat bushing 9, supported in an opening 10 in the extremity 3 of the suspension bar 1. The spring 7 is normally under compression and therefore holds the bushing 9 against its spherical seat 11. The bushing 9 comprises the forward portion having the general outline of a hemisphere and a cylindrical rear portion. The tension rod 6 passes through an opening extending longitudinally through the bushing 9. Consequently the bearing area afforded by this opening in the bushing is much greater than the bearing area which would be afforded if the rod passed directly through the extremity 3. The spring 7 which surrounds rod 6 bears directly against the forward face 12 on the bushing 9. An annular rib 13 is preferably provided adjacent the opening in the forward face of the bushing. This rib acts as a guide to assist in maintaining the spring in its proper bearing position against the face 12 which comprises a seat for the spring. The relation between the hemispherical portion of the bushing 11 and its seat in the extremity 3 is somewhat similar to a ball and socket joint, whereby considerable freedom of movement is permitted between the bushing and the seat. The advantage of this freedom of movement is that the tension rod 6 is permitted to assume any one of a number of positions which may deviate slightly from the exact horizontal position illustrated in the drawings. It is apparent, for example, that if the suspension links 5 did not happen to be suspended vertically but were swung to one side or the other through a slight angle, the inner end of the rod 6 would be moved from the position in which it is illustrated to a new position along the arc of a circle, causing said rod and bushing to assume a new position with respect to the extremity 3, which might be at a considerable angle with respect to the normal position. This possible deviation is illustrated by the dotted line in Fig. 2. This freedom of movement is permitted, and at the same time a relatively close fit is maintained between the tension rod 6 and the bushing 9. If the bushing were not used but the rod 6 were passed directly through an opening in the extremity 3, the opening of necessity would have to be somewhat larger than the rod in order to provide sufficient freedom of movement of said rod when it deviates from its normal position, as described above.

By the use of the improved bushing described I am able to secure not only the desired length in bearing, but also the necessary freedom of movement. As a result the wear is greatly diminished and an improved seat for the end of the tension spring is provided.

I do not desire to limit myself to the exact construction described and illustrated, as it is obvious that other embodiments may be devised which fall within the scope of the invention.

I claim as my invention:

1. A spring seat bushing for a tension rod comprising a hemispherical forward portion and a cylindrical rear portion.

2. As a new article of manufacture, a spring seat bushing having an opening therethrough to accommodate a tension rod and having a substantially hemispherical forward portion and a cylindrical rear portion of reduced diameter, said forward portion having a flat face adapted to act as a seat for the spring and having an annular rib surrounding said opening.

3. In combination, a supporting bar, a rod passing through said bar, a bushing slidably mounted on said rod, said bushing being provided with a conical face and said supporting bar being provided with a conical seat shaped to receive said bushing face to permit slight rocking movements of said rod with relation to said support.

4. In combination, a relatively fixed support, a rod longitudinally movable through said support and a bushing surrounding said rod, said bushing having a conical portion bearing against one side of said support, and an extension loosely passing through said support whereby said rod may rock with relation to said support.

5. In a generator suspension, means for supporting the generator, a tension rod tending to swing said generator in one direction, said rod passing through said support, a bushing on said rod, said bushing being provided with a conical face, and said support being provided with a conical shaped seat to receive said bushing face to permit slight rocking movements of said rod with relation to said support.

6. In combination, a supporting bar, a rod passing through said bar, a bushing slidably mounted on said rod, said bushing being provided with a rounded face, and said supporting bar being provided with a seat shaped to receive said bushing face to permit slight rocking movements of said rod with relation to said support.

In witness whereof, I have hereunto subscribed my name in the presence of two witnesses.

WILLIAM L. BLISS.

Witnesses:
 WM. A. TURBAYNE,
 F. J. CALLOHAN.